United States Patent
Itoh et al.

(10) Patent No.: US 6,757,038 B2
(45) Date of Patent: Jun. 29, 2004

(54) LIQUID CRYSTAL DISPLAY DEVICE AND ELECTRONIC APPARATUS

(75) Inventors: Tomoyuki Itoh, Okaya (JP); Ichiro Murai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/655,302

(22) Filed: Sep. 5, 2003

(65) Prior Publication Data

US 2004/0075793 A1 Apr. 22, 2004

(30) Foreign Application Priority Data

Sep. 20, 2002 (JP) ........................................ 2002-274865

(51) Int. Cl.$^7$ ............................................ G02F 1/1335
(52) U.S. Cl. ...................... 349/113; 349/106; 349/122; 349/114; 349/107
(58) Field of Search ................................ 349/106, 107, 349/113, 114, 122

(56) References Cited

U.S. PATENT DOCUMENTS

| | | | |
|---|---|---|---|
| 2003/0063244 A1 * | 4/2003 | Fujimori et al. | 349/113 |
| 2003/0076464 A1 * | 4/2003 | Ozawa et al. | 349/113 |
| 2003/0231267 A1 * | 12/2003 | Murai et al. | 349/113 |
| 2004/0032552 A1 * | 2/2004 | Kim | 349/113 |

FOREIGN PATENT DOCUMENTS

| | | |
|---|---|---|
| JP | A 11-242226 | 9/1999 |
| JP | A 2000-267081 | 9/2000 |

* cited by examiner

*Primary Examiner*—Toan Ton
*Assistant Examiner*—Tai Duong
(74) *Attorney, Agent, or Firm*—Oliff & Berridge, PLC

(57) ABSTRACT

The invention provides a transflective liquid crystal display device capable of obtaining a high contrast display in a transmissive display and a reflective display. In particular, in a liquid crystal display device according to the invention, a reflective display region and a transmissive display region can be formed in one pixel region, a reflection layer is provided on an array substrate in the reflective display region, an inclined region, in which the thickness of a liquid crystal layer varies consecutively between the transmissive display region and the reflective display region, is provided between the transmissive display region and the reflective display region, an edge of the inclined region at the transmissive display region side being formed in a plane region of the reflection layer, a first color material layer is formed in the reflective display region, and a second color material layer is formed in the inclined region and the transmissive display region, the degree of coloration of the second color material layer being higher than that of the first color material layer. The first color material layer and the second color material layer may overlap each other in the plane region of the inclined region.

5 Claims, 6 Drawing Sheets

LIQUID CRYSTAL DISPLAY DEVICE AND ELECTRONIC APPARATUS

BACKGROUND OF THE INVENTION

1. Field of Invention

The present invention relates to a transflective color liquid crystal display device.

2. Description of Related Art

A transflective liquid crystal device having a structure that the thickness of a liquid crystal layer is thinner in a reflective display region than in a transmissive display region is disclosed in Japanese Unexamined Patent Application Publication No. 11-242226. Such a structure is called a multi-gap-type of structure and can be realized, for example, by providing a liquid crystal layer-thickness adjusting layer below a transparent electrode and above a reflection film of a lower substrate. In the liquid crystal layer-thickness adjusting layer, a portion corresponding to the transmissive display region becomes an opening portion. Namely, in the transmissive display region, the thickness of the liquid crystal layer is thicker than that of the reflective display region by the thickness of the liquid crystal layer-thickness adjusting layer. Accordingly, it is possible to optimize the retardation $\Delta n \cdot d$ with respect to both the transmissive display light and the reflective display light. In order to adjust the thickness of the liquid crystal layer by using the liquid crystal layer-thickness adjusting layer, the liquid crystal layer-thickness adjusting layer must be very thick, and is formed, for example, of a photosensitive resin.

SUMMARY OF THE INVENTION

In the above multi-gap-type transflective liquid crystal device, a photolithographic method is used to form the liquid crystal layer-thickness adjusting layer having an opening portion by using a photosensitive resin. However, due to the exposure accuracy when using the photolithographic method or side-etching when developing, an edge of the opening portion of the liquid crystal layer-thickness adjusting layer, that is, a boundary region of the transmissive display region and the reflective display region has a tapered, inclined plane. Therefore, the thickness of the liquid crystal layer varies consecutively in the boundary portion of the transmissive display region and the reflective display region so that the retardation $\Delta n \cdot d$ also varies consecutively and turns out to be unsuitable for both transmissive display light and reflective display light in this portion. Further, an initial alignment state of liquid crystal molecules forming the liquid crystal layer is defined by the alignment films of the lower substrate and the upper substrate, however, since the force for regulating the alignment of the alignment films acts at an angle on the inclined plane, the alignment of the liquid molecules in this portion becomes disordered.

In this regard, in the conventional multi-gap-type transflective liquid crystal display device, if the liquid crystal layer is designed as normally white, for example, it should provide a black display when a voltage is applied to it. But the fact is that light leakage occurs in the boundary portion of the transmissive display region and the reflective display region, and there is a problem that the contrast is lowered.

The present invention has been made to solve the above problems. An object of the present invention is to provide a transflective liquid crystal display device which is capable of displaying with a high contrast in both transmissive display and reflective display.

Further, another object of the present invention is to provide an electronic apparatus, which is capable of high quality display, comprising the above liquid crystal display device.

A transflective liquid crystal display device according to the present invention can include an upper substrate and a lower substrate which are opposed to each other, and a liquid crystal layer being interposed between the upper substrate and the lower substrate, in which a reflective display region and a transmissive display region are formed in one pixel region, and a reflection layer is provided on the lower substrate in the reflective display region. Further, an inclined region, in which the thickness of the liquid crystal layer varies consecutively between the transmissive display region and the reflective display region, can be provided between the transmissive display region and the reflective display region, an edge of the inclined region at the transmissive display region side being disposed in the reflection layer, a first color material layer is formed in the reflective display region, and a second color material layer is formed in the inclined region and the transmissive display region, the degree of coloration of the second color material layer being higher than that of the first color material layer.

In the liquid crystal display device according to the present invention, the inclined region, which is an inferior display portion, is disposed in a plane region of the reflection layer, and the second color material whose degree of coloration is comparatively high extends to the inclined region. That is, light incident on the inclined region is transmitted through the second color material layer having a high degree of coloration, is reflected on the reflection layer, and thereafter, is again transmitted through the second color material layer having a high degree of coloration to reach observers. Therefore, the luminance reduces remarkably. In the inclined region between the reflective display region and the transmissive display region whose thickness of the liquid crystal layer is different from each other, because the thickness of the liquid crystal layer varies consecutively, alignment of the liquid crystal becomes irregular. Therefore, it is impossible to prevent the leakage light from occurring. However, by the above structure, observers hardly recognize the leakage light of the inclined region. Further, it is possible to prevent a contrast of the reflective display from being lowered. Since the leakage light of the inclined region does not affect the contrast in the transmissive display, a high contrast display can be obtained. In addition, in the liquid crystal display device according to this invention, it does not need to provide a light shielding film in the inclined region. Thus, there is an advantage that a high luminance display can be obtained in comparison to structures having such light shielding film.

Next, the liquid crystal display device according to this invention may have a structure that the first color material layer and the second color material layer are formed directly on the reflection layer. According to the above structure, it is possible to effectively prevent a color drift in the reflective display.

Next, the liquid crystal display device according to this invention may have a structure that the first color material layer and the second color material layer partially overlap each other in the inclined region. According to the above structure, in the portion where the first color material layer and the second color material layer partially overlap each other, the chromaticity of the color material layer becomes much higher and transmittance thereof lowers. Therefore, by disposing the overlapping portion in the inclined region, it is possible to reduce the leakage light from the inclined region and to increase the display contrast than the structures mentioned above.

Next, in the liquid crystal display device according to this invention, it is preferable that the boundary of the first color material layer and the second color material layer is arranged substantially in the same position as the edge of the inclined region at the reflective display region side in a plan view.

If the second color material layer is disposed on the reflection layer, a display luminance reduces a great deal in the region as same as the aforementioned structure. Therefore, it is possible to maximize the luminance in the reflective display by not disposing the color material layer in the reflective display region according to the above structure.

An electronic apparatus according to the present invention can include any one of the aforementioned liquid crystal display devices according to the present invention in a display unit thereof. According to such a structure, this invention can provide an electronic apparatus capable of switching between the transmissive display and the reflective display, capable of performing a bright, high-contrast display in both the transmissive display and the reflective display, and capable of performing a bright, high-contrast display even around a boundary of the regions used in the transmissive display and the reflective display.

BRIEF DESCRIPTION OF THE DRAWINGS

The invention will be described with reference to the accompanying in like numerals reference like elements, and wherein.

DETAILED DESCRIPTION OF PREFERRED EMBODIMENTS

Figure 1:
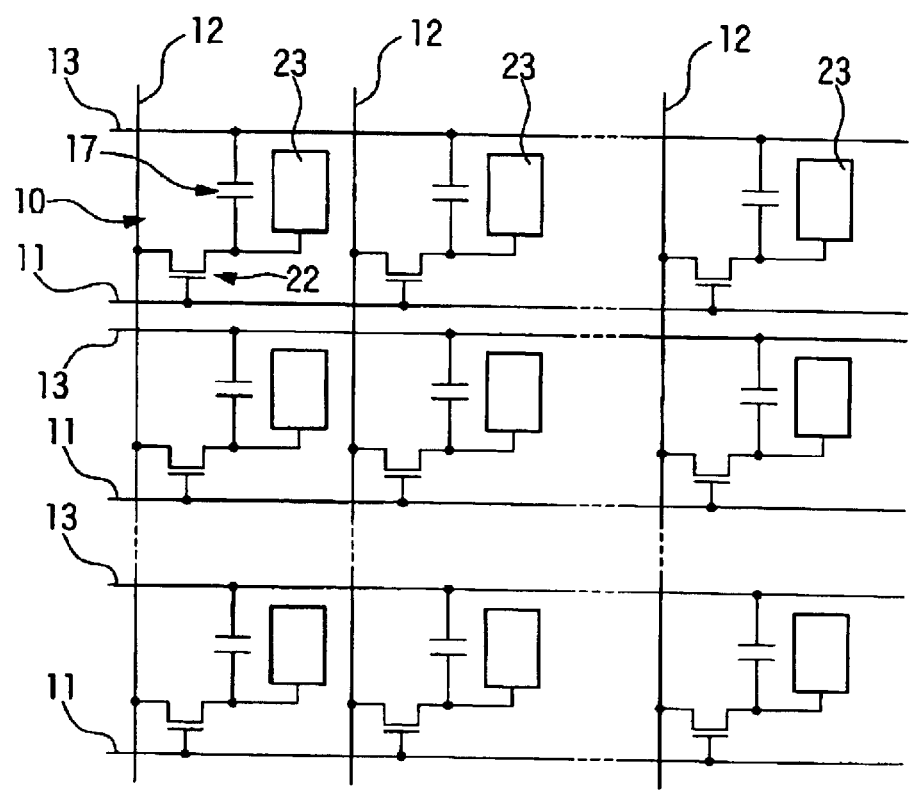
FIG. 1 is a circuit diagram illustrating the wiring structure of a liquid crystal according to a first embodiment of the present invention.
Figure 2:
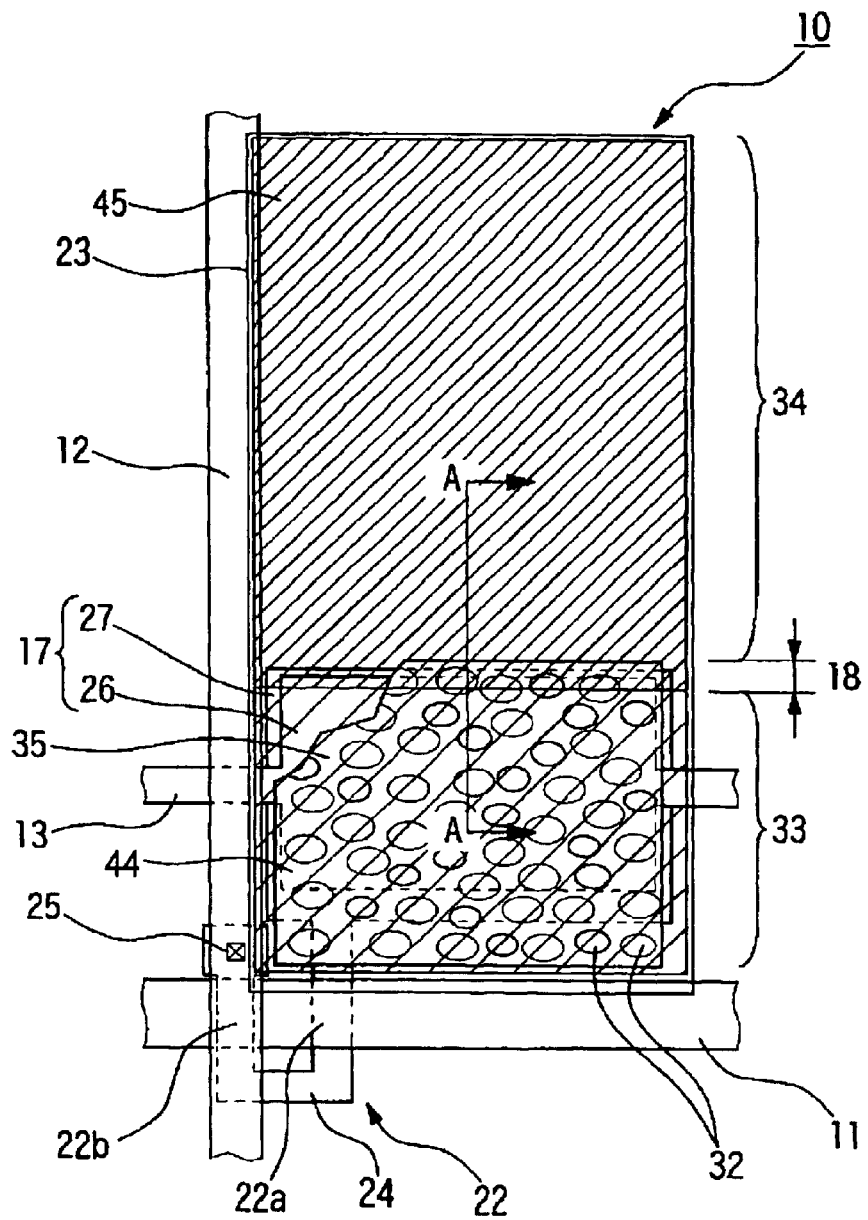
FIG. 2 is a plan view of one pixel region 10 shown in FIG. 1.
Figure 3:
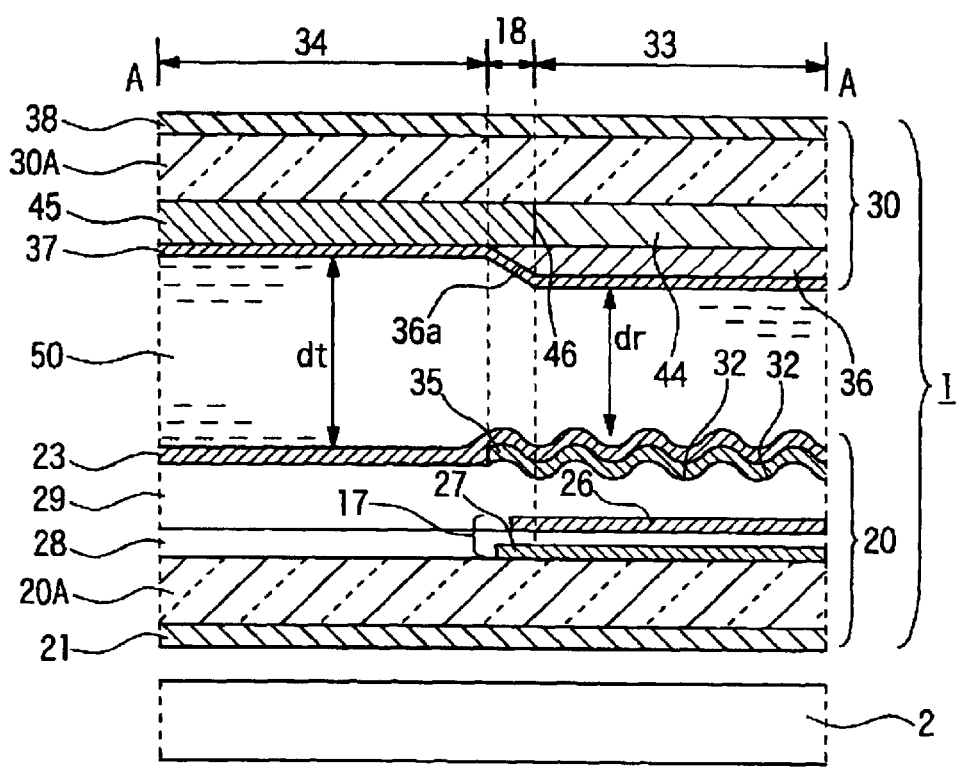
FIG. 3 is a partial sectional view taken along line A—A shown in FIG. 2.

FIG. 1 is a circuit diagram of wiring structure in a plurality of pixels, which are arranged in a matrix, constructing an active matrix-type liquid crystal display device of a first embodiment according to the present invention. FIG. 2 is a plan view of one pixel region 10 shown in FIG. 1. FIG. 3 is a partial sectional view taken along the line A—A of FIG. 2. As shown in FIG. 1 and FIG. 3, the liquid crystal display device according to the first embodiment is a transflective liquid crystal display device comprising a liquid crystal panel 1 which has a reflective display region 33 and a transmissive display region 34 in one pixel region, and has an inclined region 18 between the display regions 33 and 34, and a backlight 2 (illuminating device) provided on the rear side of the liquid crystal display device.

As shown in FIG. 1, the liquid crystal display device according to the present embodiment has a structure in which a plurality of scanning lines 11, a plurality of data lines 12 which extend in a direction intersecting the scanning lines 11, and conductive lines 13 which extend parallel to each of the scanning lines 11 are wired, respectively. Pixel regions 10 are provided around the intersections of the scanning lines 11 and the data lines 12. Pixel electrodes 23 and TFT elements 22 as pixel switching elements are formed in the pixel regions 10. The data lines 12 to which image signals are supplied are electrically connected to source electrodes of the TFT elements 22. The scanning lines 11 are electrically connected to gate electrodes of the TFT elements 22. Further, the pixel electrodes 23 are electrically connected to drain electrodes of the TFT elements 22. By switching the TFT elements 22 based on scanning signals supplied from the scanning lines 11, the image signals supplied from the data lines 12 are written in the pixel electrodes 23 at a predetermined time. Further, the image signals are held between the pixel electrode 23 and a counter electrode opposed thereto with the liquid crystal layer interposed therebetween. Furthermore, storage capacitors 17 are added parallel to the pixel electrodes 23 in order to prevent leakage of the image signals written in the pixel electrodes 23, one of electrodes constituting the storage capacitor 17 is electrically connected to the capacitive line 13.

Next, the structure of the pixel region 10 shown in FIG. 1 is explained in detail with reference to FIG. 2 and FIG. 3.

As shown in FIG. 2, a light-transmitting pixel electrode 23 having a rectangular shape in a plan view and a rectangular reflection layer 35 which overlaps a part of the light-transmitting pixel electrode 23 planarly are formed in the pixel region 10. The region in which the reflection layer 35 is formed is a reflective display region 33, and the transmissive display region 34 over the reflective display region 33 in the drawing is a light-transmitting region of the region in which the pixel electrode 23 is formed. A first color filter (a first color material layer) 44 is provided in a plane region corresponding to the reflective display region 33, and a second color filter (a second color material layer) 45 is provided continuously to the first color filter 44 from the transmissive display region 34 so as to overlap a part of the reflection layer 35 planarly. The region in which the second color filter 45 overlaps the reflection layer 35 over a plane corresponds to the inclined region 18 to be described in greater detail below. In addition, a rectangular electrode portion 26 composing the capacitive line 13 is formed below the reflection layer 35, and a rectangular capacitor electrode 27 is formed below the electrode portion 26. The electrode portion 26 and the capacitor electrode 27 oppose each other to form the storage capacitor 17.

The data line 12 and the scanning line 11 are provided along vertical and horizontal boundaries of the pixel electrode 23 in the pixel region 10. The TFT element 22 is formed around the intersection of the data line 12 and the scanning line 11. The TFT element 22 is formed in a TFT formation part 24, which is a part of a polysilicon semiconductor layer and has a substantially U-shape in a plan view, and the rectangular capacitor electrode 27 extends from an end of the U-shape TFT formation part 24 to form the polysilicon semiconductor layer together with the TFT formation part 24.

The TFT element 22 according to this embodiment is a double gate type TFT element which has channel regions 22a and 22b formed in two places in which the substantially U-shaped TFT formation part 24 and the scanning line 11 intersect each other in a plan view. A contact hole 25 is formed in the end of one arm of the TFT formation part 24 along the data line 12. The data line 12 is electrically connected to the source of the TFT element 22 through the contact hole 25. The end of the other arm of the TFT formation part 24, opposite to the contact hole 25, is the drain side of the TFT element 22. Further, although not shown, a contact hole is formed at the lower end of the capacitor electrode 27, the reflection layer 35 is electrically connected to the capacitor electrode 27 through the contact hole, and the drain of the TFT element 22 is electrically connected to the pixel electrode 23 through the contact hole.

Meanwhile, in the sectional view of FIG. 3, the liquid crystal display device according to the present embodiment can include a liquid crystal panel 1 and a backlight 2. The liquid crystal panel 1 includes an array substrate (lower substrate) 20 and a counter substrate (upper substrate) 30 which oppose each other, and a liquid crystal layer 50 interposed between the upper and lower substrates 20 and 30. The backlight 2 is disposed on the outside of the array substrate 20 of the liquid crystal panel 1. The array substrate 20 includes a transparent substrate 20A made of glass, plastic, or resin film. The capacitor electrode 27, a first interlayer insulating film 28 for covering the capacitor electrode 27, the electrode part 26 (and scanning line 11), a second interlayer insulating film 29 for covering the electrode part 26, the reflection layer 35 partially formed on the second interlayer insulating film 29, and the pixel electrode 23 for covering the reflection layer 35 are formed inside the array substrate 20A (at the liquid crystal layer 50 side).

The capacitor electrode 27 and the electrode part 26 oppose each other in a vertical direction of the liquid crystal panel, and form the storage capacitor 27 in which the gate insulating film serves as an insulating layer.

The capacitor electrode 27 is electrically coupled to the reflection layer 35 (pixel electrode 23) through a contact hole (not shown) which passes through the first and second interlayer insulating films 28 and 29.

The reflection layer 35 is formed on the second interlayer insulating film 29 over the electrode part 26, a plurality of fine concave portions 32 are formed on the surface of the second interlayer insulating film 29 in the region in which the reflection layer 35 is formed to diffuse the reflected light from the reflection layer 35. Further, a polarizer 21 is provided on the outside of the substrate 20A.

The counter substrate 30 can include a transparent substrate 30A made of glass, plastic, or resin film. A first color filter 44 and a second color filter 45 which are adjacent to each other horizontally, a resin layer 36 partially formed on the color filters 44 and 45, and the counter electrode 27, which is made of a transparent conductive material such as ITO, for covering the resin layer 36 are provided on the inner surface of the array substrate 30A (at liquid crystal layer side 50). Further, a polarizer 38 is provided on the outer surface of the substrate 30A.

The resin layer 36 is formed in a position corresponding to the reflective display region 33 of the pixel region 10. The length of optical paths in the both display regions is adjusted by adjusting the liquid crystal layer-thickness dr in the reflective display region 33 and the liquid crystal layer-thickness dt in the transmissive display region 34 by the resin layer 36. Accordingly, it is possible to display with high luminance in both the reflective display and the transmissive display.

Further, the resin layer 36 has an inclined portion 36*a* which is inclined to the substrate 30A in the edge portion of the resin layer. In the liquid crystal display device according to the present embodiment, outer edge of the inclined portion 36*a* (that is, the peripheral edge of the resin layer 36) is disposed in the plane region of the reflection layer 35. Therefore, the plane region of the inclined portion 36*a* which is disposed between the reflective display region 33 and the transflective display region 34 is an inclined region 18.

The above second color filter 45 has a higher degree of coloration than that of the first color filter 44. In the liquid crystal display device according to the present embodiment having such a structure, it is possible to obtain a display in which the chromaticity is optimized in both the reflective display and the transmissive display modes. That is, in the reflective display region 33, incident external light is transmitted through the first color filter 44, reflected by the reflection layer 35, and then transmitted through the first color filter again 44 to reach observers. On the contrary, in the transmissive display region 34, since light emitted from the backlight 2 is transmitted through the second color filter 45 only once to reach the observers who are in front of the liquid crystal panel 1, it is possible to properly adjust the chromaticity for each display light by adjusting the degree of coloration in consideration of the number of times of being transmitted through the color filter.

Further, even though not shown, alignment films are provided on the pixel electrode 23 and the counter electrode 37 to cover the electrodes.

In the liquid crystal display device according to the present embodiment having such a structure, in an environment in which external light can be used, such as in a bright outside, the reflective display is performed by reflecting the external light by the reflection layer 35 in the reflective display region 33, and in an environment in which external light can not be used, the transmissive display is performed by transmitting light emitted from the backlight 2.

In the liquid crystal display according to the present embodiment, as shown in FIG. 3, the edge of the inclined region 18 at the transmissive display region side and the edge of the reflection layer 35 at the transmissive display region side are substantially in the same position in a plan view. Additionally, the second color filter 45 is formed from the transmissive display region 34 to the inclined region 18. By such a structure, observers hardly view an inferior display part due to the irregularity of thickness of the liquid crystal layer in the inclined region 18. Further, it is possible to obtain a transmissive display and a reflective display with high luminance and high contrast.

That is, since the above inclined region 18 is in the plane region of the reflection layer 35, the display light from the inclined region 18 is the light reflected by the reflection layer 35 similarly to the light in the reflective display region 33. In this regard, since the second color filter 45 extends to the inclined region, the display light of the inclined region 18 is the light which is transmitted through the second color filter 45 twice.

As mentioned above, the second color filter 45 has a higher degree of coloration than that of the first color filter 44, thus the light transmitted through the second color filter 45 twice becomes light of a narrow wavelength band. Therefore, the luminance of the light is remarkably lowered in comparison to the reflective display light which is transmitted through the first color filter 44 twice or the transmissive display light which is transmitted through the second color filter 45 once. As a result, it is possible that the inclined region 18, which is the inferior display part, is almost in a light shielding state to reduce the influence on the contrast of reflective display by the display light of this region.

In addition, in order to prevent the contrast lowering due to the inferior display quality of the above inclined region 18, it is conceivable that a light shielding film is provided in an plane region including the inclined region 18, for example, below the inner surface of the array substrate 20 or on the inner surface of the counter substrate 30. However, in this case, it is necessary to form the light shielding film in a wider plane region than the above inclined region 18 in consideration of the processing accuracy of the light shielding film or the alignment accuracy of the array substrate and the counter substrate when assembling. On the contrary, in the liquid crystal display device according to the present embodiment, even though such a light shielding film is not provided, it is possible to obtain a high contrast display as described above. In addition, since luminance is lowered only in the region where the reflection layer 35 and the second color filter 45 overlap each other planarly, it is possible to obtain a high aperture ratio and thus to obtain a high luminance display, and to make the portion turning dark in the pixel region not become wider than necessary.

Further, in this embodiment, the resin layer 36 is provided partially at the inner side of the counter substrate 30 in order to make the thickness dr of the liquid crystal layer in the reflective display region 33 different from the thickness dt of the liquid crystal layer in the transmissive display region 34. However, such a structure for adjusting the thickness of the liquid crystal layer may be provided at the array substrate 20 side.

Further, the boundary 46 between the first color filter 44 and the second color filter 45 and the edge of the inclined region 18 at the reflective display region side are arranged substantially in the same position in a plan view. This structure can obtain the maximum luminance in the reflective display. However, in the liquid crystal display device according to the present invention, the second color filter 45 has only to extend to the plane region including the inclined region 18. For example, in the case of having difficulty in matching the position of the boundary 46 and the inclined region 18 due to processing accuracy with respect to the color filter or the like, it is preferable that the boundary 46 is disposed in the reflective display region 33. In this regard, the luminance of the reflective display is lower than that in the above embodiment. However, it is possible to at least prevent the contrast from lowering in the reflective display.

Figure 4:
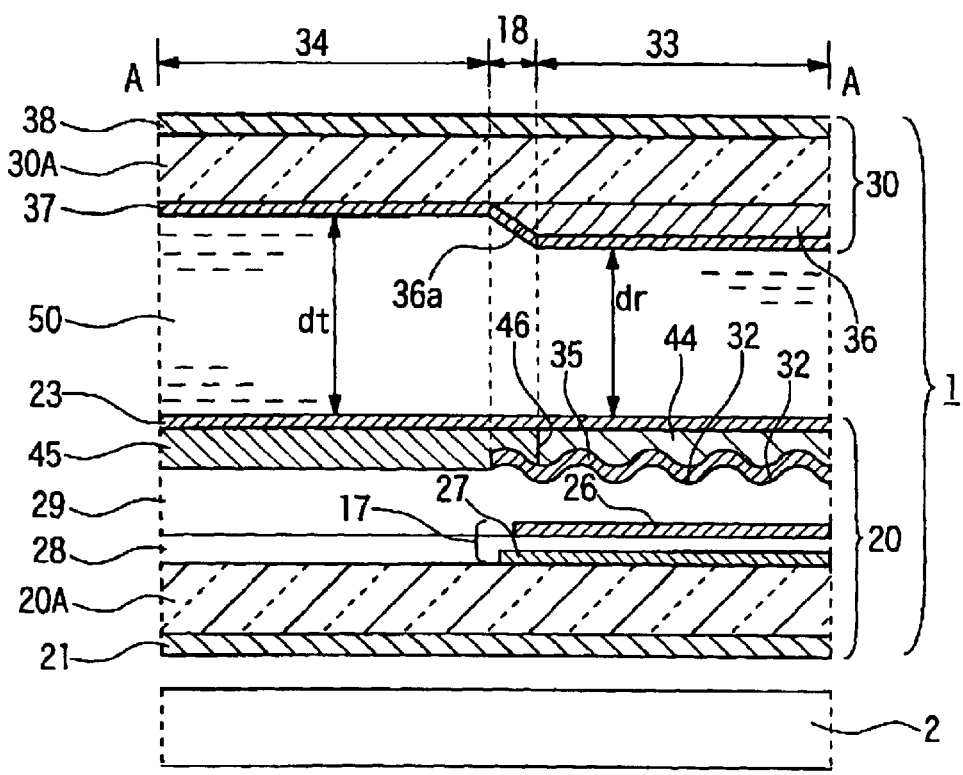
FIG. 4 is a partial sectional view of a second embodiment according to the present invention.

Even though the above first embodiment has a structure in which the first and second color filters 44 and 45 are provided in the counter electrode 30, the color filters 44 and 45 may be provided on the array substrate 20 side. Such a structure will be described below with reference to FIG. 4. FIG. 4 is a sectional view illustrating a liquid crystal display device in which the first and second color filter 44 and 45 are formed as a layer right above the reflection layer 35 formed on the second interlayer insulating layer 29 of the array substrate 20. The liquid crystal display device the sectional structure of which is shown in FIG. 4 has the same structure in a plan view as the liquid crystal display device shown in FIG. 2. Elements in FIG. 4 having the same reference numerals as those in FIG. 2 and FIG. 3 are the same elements.

In the liquid crystal display device shown in FIG. 4, the first color filter 44 is provided in the reflective display region 33 directly on the reflection layer 35 of the array substrate 20. The second color filter 45 is provided adjacent to the first color filter 44, and from the transmissive display region 34 to the inclined region 18 on the same layer as the first color filter. The boundary 46 between the first and second color filters 44 and 45 is substantially in the same position in a plan view as the edge of the inclined region 18 at the reflective display region 33 side. The pixel electrode 23 is formed to cover the above first and second color filters 44 and 45.

According to the above type of the liquid crystal display device, besides the same effect as the above liquid crystal display device of the first embodiment, it is possible to prevent color drifts of the reflective display and to improve the display quality by disposing the color filter 44, which is a color material layer, directly on the reflection layer 35.

Next, a third embodiment according to the present invention will be described below with reference to FIG. 5. In the liquid crystal display device shown in FIG. 5, the resin layer 36, which is the liquid crystal layer-thickness adjusting layer shown in FIG. 4, is formed on the array substrate 20 side. Except for the arrangement of the resin layer 36, the liquid crystal display device shown in FIG. 5 has the same structure as that of the liquid crystal display device having the sectional structure as shown in FIG. 4. Further, the plane structure is also the same as that of the liquid crystal display device shown in FIG. 2. Therefore, elements in FIG. 5 having the same reference numerals as those in FIG. 2 to FIG. 4 are the same elements.

Figure 5:
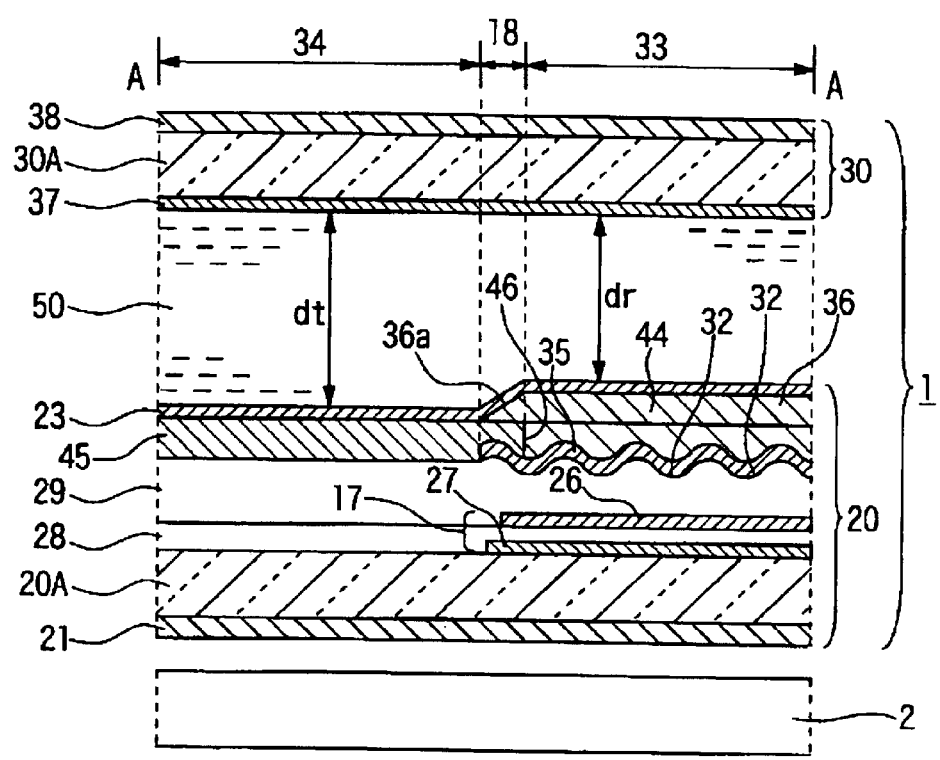
FIG. 5 is a partial sectional view of a third embodiment according to the present invention.

In the liquid crystal display device shown in FIG. 5, the first color filter 44 is provided in the reflective display region 33 directly on the reflection layer 35 of the array substrate 20. The second color filter 45 is provided adjacent to the first color filter 44, and from the transmissive display region 34 to the inclined region 18, on the same layer as the first color filter. The resin layer 36 is partially formed on the color filters 44 and 45, and the inclined portion 36a is formed at the peripheral portion of the resin layer. The position of outer edge of the inclined portion 36a is almost equal to the edge of the reflection layer 35 at the transmissive display region side over a plan, and the position of inner edge of the inclined portion is almost equal to the boundary 46 between the color filters 44 and 45 in a plan view. Therefore, the inclined region 18a which is the plane region of the above inclined portion 36a is disposed in the plane region of the reflection layer 36. Further, the inclined region 18 and the second color filter 45 overlap each other planarly.

Then, the pixel electrode 23 is formed to cover the above first color filters 44 and resin layer 36.

The above type of liquid crystal display device, besides having the same effects as the above liquid crystal display device of the first and second embodiments, has an advantage that the alignment-adjustment in the each pixel region 10 is not needed when bonding the array substrate 20 and the counter electrode by forming the resin layer 36 on the array substrate 20.

Figure 6:
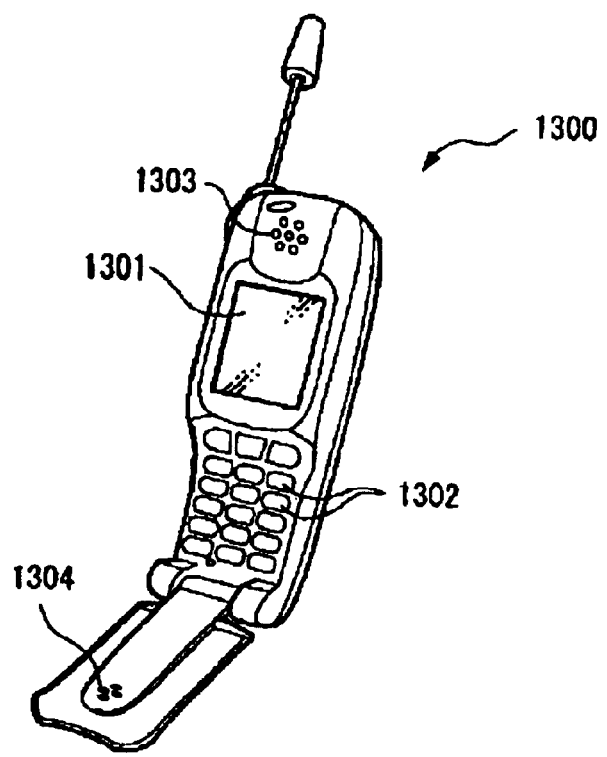
FIG. 6 is a perspective view illustrating an example of an electronic apparatus present invention.

FIG. 6 is a perspective view illustrating an example of mobile phone which is an electronic apparatus including the liquid crystal display device according to the present invention as a display unit. The mobile phone 1300 can include the liquid crystal display device according to the present invention as a small-sized display unit 1301, and includes a plurality of manipulating buttons 1302, an earpiece 1303, and a mouthpiece 1304.

Further, the liquid crystal display devices of the above embodiments can be appropriately used as image display device for electronic books, personal computers, digital still cameras, liquid crystal televisions, view finder type or monitor direct viewing type video tape recorders, car navigation systems, pagers, electronic organizers, electronic calculators, word processors, workstations, television phones, POS terminals, and various apparatuses including a touch panel. The liquid crystal display device can provide a high quality color display in any such electronic apparatus.

In this example, after manufacturing the transflective color liquid crystal display device according to the embodiment shown in FIG. 2 and FIG. 3, the contrast ratio thereof is evaluated. Further, as a comparative example, a liquid crystal display device is. manufactured, the structure of which is as shown in FIG. 2 and FIG. 3, and the position of the edge of the resin layer 36 on the transmissive display region 34 side is the same as the boundary between the first and second color filters 44 and 45 in a plan view. That is, in the liquid crystal display device of the comparative example, the inclined region 18 is disposed in the plane region of the reflection layer 35, but the first color filter 44 for a reflective display extends to the inclined region 18.

In both the above example and comparative example, one pixel region is 66 $\mu$m×198 $\mu$m, and a backlight is provided at the rear surface side of the active matrix-type liquid crystal panel of 176 dots×208 dots. The reflection layer 35, which is formed in the pixel region, is 50 $\mu$m×100 $\mu$m. Further, the width of the inclined portion 36a of the resin layer 36 is 6 $\mu$m. Furthermore, no light shielding layer for covering the inclined region is provided in either of the liquid crystal display devices.

The results obtained by operating the liquid crystal display device of the example and comparative example manufactured as mentioned above and measuring reflectivity and contrast ratio are shown in Table 1 below. As shown in Table 1, it is confirmed that the liquid crystal display device example satisfying the requirements of the present invention, shows in the transmissive display the same contrast ratio and reflectivity as the comparative example in which the second color filter is not disposed in the inclined region 18, and shows in the reflective display improved contrast ratio by 40% or more compared to the comparative example.

TABLE 1

|  | Reflectivity | Contrast ratio (Reflective display) | Contrast ratio (Transmissive display) |
|---|---|---|---|
| Example | 30% | 30:1 | 100:1 |
| Comparative example | 30% | 21:1 | 100:1 |

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A transflective liquid crystal display device which comprises an upper substrate and a lower substrate which are opposed to each other, and a liquid crystal layer being disposed between the upper substrate and the lower substrate, a reflective display region and a transmissive display region being formed in one pixel region, and a reflection layer being provided on the lower substrate in the reflective display region, further comprising:

an inclined region, in which a thickness of the liquid crystal layer varies consecutively between the transmissive display region and the reflective display region, that is provided between the transmissive display region and the reflective display region, an edge of the inclined region at a transmissive display region side being disposed in a plane region of the reflection layer;

a first color material layer that is formed in the reflective display region; and a second color material layer that is formed in the inclined region and the transmissive display region, a degree of coloration of the second color material layer being higher than that of the first color material layer.

2. The transflective liquid crystal display device according to claim 1, the first color material layer being formed directly on the reflection layer.

3. The transflective liquid crystal display device according to claim 1, the first color material layer partially overlapping the second color material layer in the inclined region.

4. The transflective liquid crystal display device according to claim 1, a boundary of the first color material layer and the second color material layer being arranged substantially in a same position as an edge of the inclined region at the reflective display region side in a plan view.

5. An electronic apparatus comprising the transflective liquid crystal display device according to claim 1 in a display unit thereof.

* * * * *